US011035738B2

(12) United States Patent
Aliane et al.

(10) Patent No.: US 11,035,738 B2
(45) Date of Patent: Jun. 15, 2021

(54) TEMPERATURE SENSOR

(71) Applicant: Commissiariat à l'Energie Atomique et Aux Energies Alternatives, Paris (FR)

(72) Inventors: Abdelkader Aliane, Grenoble (FR); Mohammed Benwadih, Champigny sur Marne (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 1197 days.

(21) Appl. No.: 14/895,974

(22) PCT Filed: Jun. 3, 2014

(86) PCT No.: PCT/FR2014/051318
§ 371 (c)(1),
(2) Date: Dec. 4, 2015

(87) PCT Pub. No.: WO2014/195630
PCT Pub. Date: Dec. 11, 2014

(65) Prior Publication Data
US 2016/0116346 A1    Apr. 28, 2016

(30) Foreign Application Priority Data

Jun. 4, 2013  (FR) ..................... 13/55082

(51) Int. Cl.
*G01K 7/00* (2006.01)
*G01K 7/16* (2006.01)
*G01K 1/16* (2006.01)
*B29C 35/00* (2006.01)
*B29K 67/00* (2006.01)

(52) U.S. Cl.
CPC ................ *G01K 7/16* (2013.01); *B29C 35/00* (2013.01); *G01K 1/16* (2013.01); *B29K 2067/00* (2013.01); *B29K 2067/003* (2013.01)

(58) Field of Classification Search
CPC combination set(s) only.
See application file for complete search history.

(56) References Cited

U.S. PATENT DOCUMENTS

| 4,557,888 | A | * | 12/1985 | Rausing | ................ | B29C 33/505 |
| | | | | | | 156/203 |
| 5,219,642 | A | * | 6/1993 | Meakin | ............. | B29C 66/73117 |
| | | | | | | 428/212 |
| 5,526,112 | A | * | 6/1996 | Sahagen | ............... | A61B 5/0084 |
| | | | | | | 250/227.11 |

(Continued)

FOREIGN PATENT DOCUMENTS

| EP | 2506269 A1 | 10/2012 |
| GB | 2200246 A | 7/1988 |

OTHER PUBLICATIONS

Internatonal Search Report filed in PCT/FR2014/051318 dated Sep. 15, 2014; 2 pages.

(Continued)

*Primary Examiner* — Lisa M Caputo
*Assistant Examiner* — Nasir U. Ahmed
(74) *Attorney, Agent, or Firm* — Moreno IP Law LLC

(57) ABSTRACT

A flexible film of crystalline or semi-crystalline material comprising a first region surrounded by a first amorphized wall.

10 Claims, 4 Drawing Sheets

(56) References Cited

U.S. PATENT DOCUMENTS

| | | | | |
|---|---|---|---|---|
| 6,824,857 | B2 * | 11/2004 | Lochun | G08B 13/244 |
| | | | | 361/748 |
| 7,132,054 | B1 * | 11/2006 | Kravitz | A61M 37/0015 |
| | | | | 216/11 |
| 7,476,874 | B2 * | 1/2009 | Patel | G01T 1/04 |
| | | | | 250/474.1 |
| 2002/0040981 | A1 * | 4/2002 | Yamazaki | H01L 27/12 |
| | | | | 257/65 |
| 2004/0198028 | A1 * | 10/2004 | Tanaka | B23K 26/0604 |
| | | | | 438/487 |
| 2005/0124146 | A1 * | 6/2005 | Bedell | H01L 21/324 |
| | | | | 438/517 |
| 2007/0187790 | A1 * | 8/2007 | Takahashi | H01L 27/1214 |
| | | | | 257/433 |
| 2009/0236746 | A1 * | 9/2009 | Kitamura | H01L 21/76843 |
| | | | | 257/751 |
| 2010/0319436 | A1 | 12/2010 | Sun | |
| 2011/0217811 | A1 * | 9/2011 | Tanaka | H01L 31/03685 |
| | | | | 438/97 |
| 2012/0291837 | A1 * | 11/2012 | Lin | C09J 7/00 |
| | | | | 136/244 |
| 2013/0200989 | A1 * | 8/2013 | Miura | H01C 7/008 |
| | | | | 338/22 SD |

OTHER PUBLICATIONS

English Translation of the Written Opinion of the International Searching Authority filed in PCT/FR2014/051318 dated Sep. 15, 2014; 9 pages.

\* cited by examiner

TEMPERATURE SENSOR

The present patent application claims the priority benefit of French patent application FR13/55082 which is herein incorporated by reference.

BACKGROUND

The present application relates to the field of temperature or pressure sensors with resistive paste.

DISCUSSION OF THE RELATED ART

The use of temperature sensors on a low-cost flexible substrate has been provided. Such sensors are used to measure the temperature of an object or other with a maximum sensitivity and accuracy.

Patent application US 2005/0232334 provides using heat sensitive resistive pastes having a positive temperature coefficient, generally called PTC, or having a negative temperature coefficient, generally called NTC, on a printed circuit board or on a flexible substrate. In a PTC resistor, the value of the electric resistance increases as the temperature increases. In a NTC resistor, the value of the electric resistance decreases as the temperature increases.

For certain applications, it may be desirable to use as a flexible substrate a substrate of polyethylene naphthalate (PEN) or polyethylene terephthalate (PET) type.

To obtain a good measurement accuracy, Wheatstone bridge assemblies such as that illustrated in FIG. 1 are currently used. This assembly comprises, between terminals A and C receiving a voltage Vin, a first branch, comprising a resistor RNTC1 of negative temperature coefficient and a resistor RPTC2 of positive temperature coefficient, and a second branch, in parallel on the first branch, comprising in series a resistor RPTC1 of positive temperature coefficient and a resistor RNTC2 of negative temperature coefficient. The midpoints of each of the branches, designated with references B and D, are connected to a voltage measurement device $V_G$. In known fashion, output voltage $V_G$ measured between points B and D is provided by the following relation:

$$V_G = V_{in} \cdot \left( \frac{R_{NTC} - R_{PTC}}{R_{PTC} + R_{NTC}} \right)$$

in the case where resistors RPTC1 and RPTC2 have the same resistance $R_{PTC}$ and in the case where RNTC1 and RNTC2 have the same resistance $R_{NTC}$.

Such a Wheatstone bridge normally provides a very accurate measurement of the voltage and thus of the temperature. However, tests performed by the inventors in the case where the resistors are resistors formed from resistive pastes or resistive materials deposited on flexible films of PEN or PET type, such as previously indicated, show that the measurements provide less accurate temperature values than what would be expected. The inventors have studied the origin of this phenomenon and provide herein means for dealing therewith, as will be indicated hereafter.

SUMMARY

Thus, an embodiment provides a flexible film of a crystalline or semicrystalline material comprising a first region surrounded with a first amorphized wall.

According to an embodiment, the first amorphized wall crosses the entire film.

According to an embodiment, the material is polyethylene naphthalate or polyethylene terephthalate.

An embodiment also provides a sensor comprising:
a flexible film such as previously defined; and
at least one first electric component formed on the first region.

According to a first embodiment, the first electric component is a first heat-sensitive resistor.

According to an embodiment, the first heat-sensitive resistor is made of a resistive paste.

According to an embodiment, the flexible film comprises a first cavity different from the first region surrounded with the first wall, the sensor further comprising a second heat-sensitive resistor formed in the first cavity.

According to an embodiment, the sensor comprises third and fourth heat-sensitive resistors assembled as a Wheatstone bridge with the first and second heat-sensitive resistors.

According to an embodiment, the flexible film comprises a second region surrounded with a second amorphized wall, the third heat-sensitive resistor being formed on the second region.

According to an embodiment, the flexible film comprises a second cavity different from the first region surrounded with the first wall and from the second region surrounded with the second wall, the fourth heat-sensitive resistor being formed in the second cavity.

An embodiment also provides a method of manufacturing an amorphized wall surrounding a flexible film of a crystalline or semicrystalline material comprising briefly heating with a laser or ultraviolet rays a region which is desired to be amorphized.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
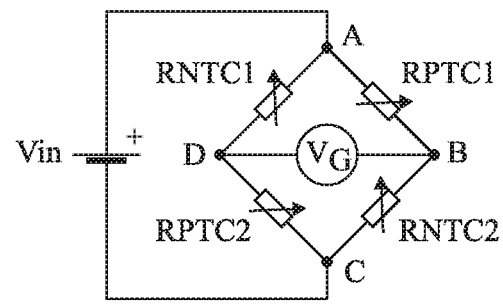
FIG. 1 is a circuit diagram of a Wheatstone bridge assembly.

For clarity, the same elements have been designated with the same reference numerals in the various drawings and, further, the various drawings are not to scale. In the following description, unless otherwise indicated, terms "substantially", "approximately", and "in the order of" mean "to within 10%". Further, only those elements which are useful to the understanding of the present description have been shown and will be described. In particular, the processing of the signals provided by the temperature sensors are well known by those skilled in the art and are not described any further.

In the following description, flexible film designates a support having a thickness from 50 to 200 µm and having a flexible behavior, that is, the support may, under the action of an external force, deform, and particularly bend, without breaking or tearing. Further, a crystalline material is a single-crystal material, that is, formed of a single homogeneous crystal, in one piece and with no grain boundary, or a polycrystalline material, that is, comprising a plurality of crystals. Further, a semicrystalline material is a material comprising crystalline areas and amorphous areas with a crystallinity rate greater than 10%, preferably greater than 20%.

Tests carried out by the inventors on an embodiment, in printed electronics, of a Wheatstone bridge based on heat-sensitive materials, particularly PTC and NTC resistive pastes or inks formed on a flexible film of PEN or PET type have shown that the obtained results were not exactly those which would theoretically be expected. The inventors have analyzed this phenomenon and impute such an inaccuracy to the fact that, in order for the Wheatstone bridge to provide accurate results by doing away with noise, a non-negligible current in the order of one milliampere should flow through the heat-sensitive resistors of the bridge. This results in a heating by Joule effect of the heat-sensitive resistors. According to cases, the NTC resistors or the PTC resistors heat up more than the others and their heating affects the resistors of the other type. Such a crossed heating causes a misadjustment of the bridge, and thus inaccurate or even erroneous measurements.

It is here provided to overcome this disadvantage.

Figure 2A:
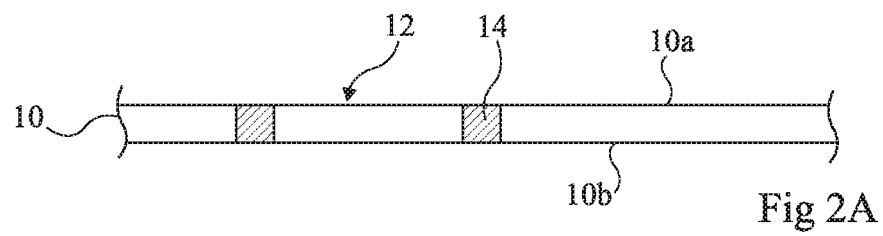
FIGS. 2A and 2B respectively are a cross-section view and a top view of a flexible film such as provided herein.
Figure 2B:
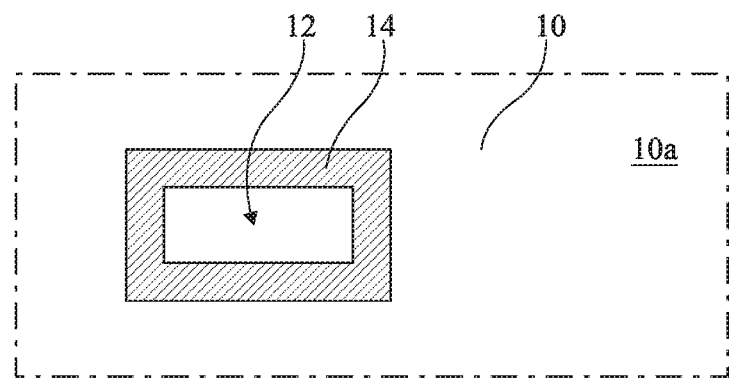

FIGS. 2A and 2B are a cross-section view and a top view of a portion of a flexible film 10 comprising a first face 10a, a second face 10b and a region 12 whereon a component capable of heating is desired to be formed. To avoid for the heating of a component formed in region 12 to propagate towards components formed in the neighborhood, region 12 is surrounded with a wall 14 more thermally insulating than film 10 in its natural state. In FIG. 2A, wall 14 has been illustrated as thoroughly crossing film 10. It is possible for penetration of wall 14 into the film to be only partial.

The PEN or PET films actually have a crystalline nature. It is here provided to form wall 14 by making it amorphous (by amorphizing) the region of the film corresponding to wall 14. For this purpose, the region corresponding to the wall is heated above the vitreous transition temperature of the flexible film. For a flexible PEN film, the vitreous transition temperature is in the order of 120° C. and for a flexible PET film, the vitreous transition temperature is in the order of 60° C.

Due to the presence of wall 14, the heat generated by Joule effect in a component formed on top or inside of region 12 surrounded with the wall rapidly propagates towards the substrate having the flexible film arranged thereon and is thus discharged without affecting neighboring elements.

An embodiment of the forming of a resistor of positive temperature coefficient and of a resistor of negative temperature coefficient close to the first one will now be described in relation with FIGS. 3 to 8.

Figure 3:
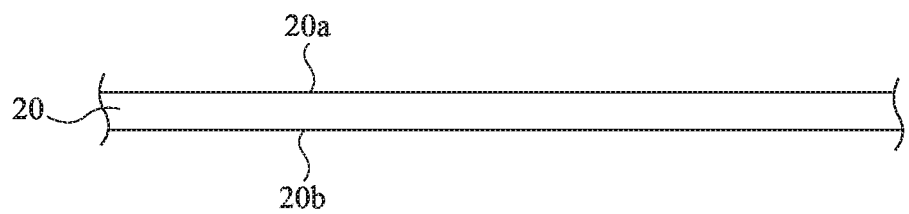
FIGS. 3 to 8 illustrate successive steps of the forming of two resistors formed from resistive pastes on a flexible film.

As illustrated in FIG. 3, it is started from a crystalline or semicrystalline flexible film 20 having a first face 20a (also indicated in FIG. 4B) and a second face 20b. Flexible film 20 is for example made of a plastic polymer. The flexible film may be made of a material selected from the group comprising PEN, PET, polypropylene (PP), polystyrene (PS), particularly isotactic polystyrene, polycarbonate (PC), polyimide (PI), polyether-etherketone (PEEK), and a mixture of two or more of these components. It for example is a flexible polymer film, for example, made of PEN or PET, As a variation, it may be a flexible polypropylene, isotactic polystyrene, or polycarbonate film. This film may have a thickness from 50 to 200 µm, for example in the order of 125 µm.

Figure 4A:
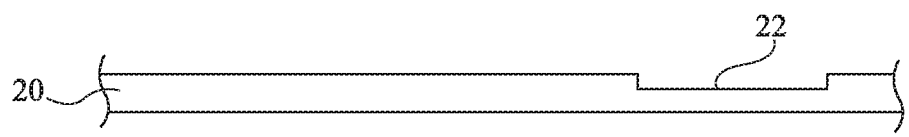
Figure 4B:
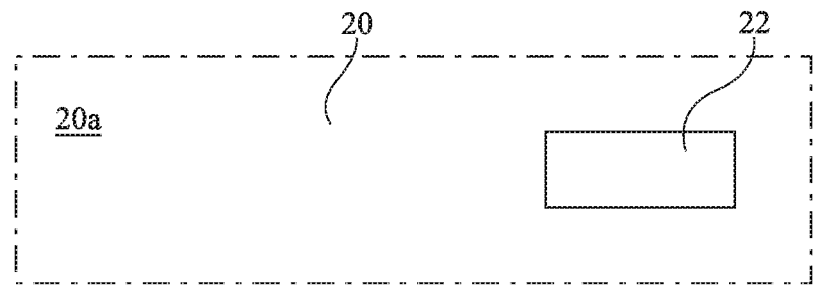

As illustrated in cross-section view and in top view in FIGS. 4A and 4B, a cavity 22 is then preferably formed in flexible film 20 at the location where a NTC resistor is desired to be formed. Cavity 22 may be formed by any known means, for example, by wet etching or by a plasma etching in the presence of $O_2$ and of $SF_6$ with the use of a photolithography mask to define the pattern of cavity 22, or also by laser abrasion. The etched thickness is for example in the range from 5 to 10 µm. The aim of cavity 22 which will then receive the NTC sensitive resistive paste (that which, currently, heats less by Joule effect) is to improve the heat transfer between the support of the flexible film and the NTC resistive paste.

Figure 5A:
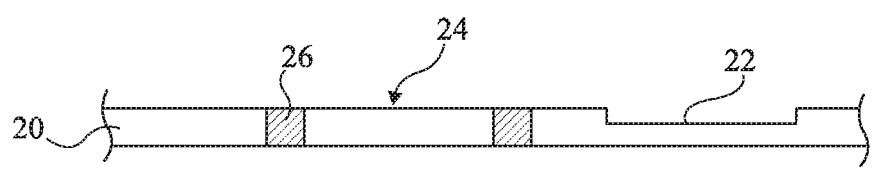
Figure 5B:
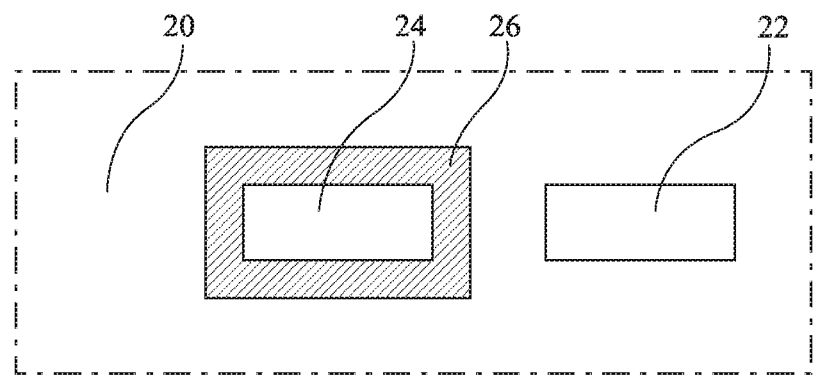

As illustrated in cross-section view and in top view in FIGS. 5A and 5B, the next step comprises forming a wall 26 surrounding a region 24 whereon a PTC resistor is for example desired to be formed. To achieve this, the region not to be made amorphous is masked by a mechanical mask open at the locations where an amorphization is desired to be performed. This step may be carried out by using an excimer laser with a power in the order of 100 watts or a short ultraviolet pulse (ultraviolet flash lasting from a few nanoseconds to a few milliseconds, particularly from 0.5 to 1.5 ms) by means of the device commercialized under trade name PulseForgge by Novacentrix or under trade name Sinteron 2000 by Xenon Corporation. The heating may be performed only once with an excimer laser, but may have to be repeated in the case where ultraviolet flashes are used. By these various means, the temperature of the regions to be amorphized in the PEN, PET substrate is very briefly taken to a temperature in the order of 260° C., after which these regions are rapidly cooled down to be made amorphous.

In practice, a wall which may have a width in the range from 70 to 200 µm is obtained, a 100-µm width being generally sufficient.

Figure 6:
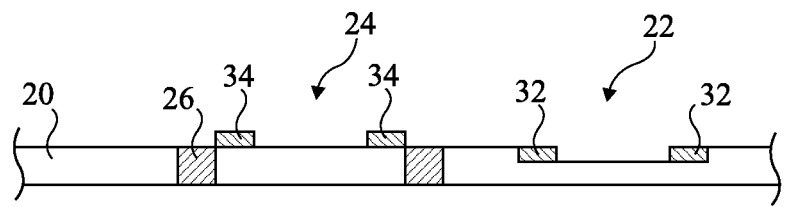

At the next step, the result of which is illustrated in FIG. 6, pads and metal tracks are formed at the locations where contacts and connections are desired to be formed. Two pads 32 have been shown as an example in region 22 and two pads 34 have been shown in region 24. This may be done by physical vapor deposition (PVD) and then etching of metals such as Au, Cu, Ag, Ti . . . . Further, electrodes made of silver or copper or even of conductive polymer such as PEDOT:PSS (poly(3,4-ethylenedioxythiophene):poly(styrene sulfonate)) may be deposited by silk-screening or by inkjet. This deposition and etching step may be followed by a plasma treatment in the presence of oxygen with a 50 sccm flow rate and a 80-W power for 60 seconds to improve the adherence of the heat-sensitive resistive paste which is then deposited. A treatment in the presence of ultraviolet rays and/or of ozone for from 3 to 5 minutes may be performed.

Figure 7:
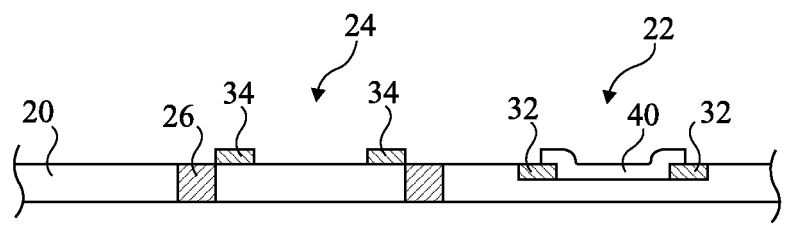

At the step illustrated in FIG. 7, a portion 40 of NTC resistive paste has been deposited by silk-screening inside of cavity 22 with an average thickness in the order of 10 µm. The lateral dimensions of portion 40 are for example at least 100 µm by 200 µm.

This step is followed by an anneal at 130° C. for from 15 to 30 min. The NTC paste may be a metal oxide such as indium-gallium-zinc oxide or IGZO if the deposit is protected from light (since IGZO is very sensitive to light), zinc oxide ZnO, or antimony tin oxide $SnO_2$:Sb or ATO. The NTC paste may also be of organic conductive polymer type such as PEDOT:PSS, or even graphene or a graphene composition with an inorganic material of perovskite type such as BaTiO$_3$, which very substantially increases the thermal coefficient of resistance or TCR.

Figure 8A:
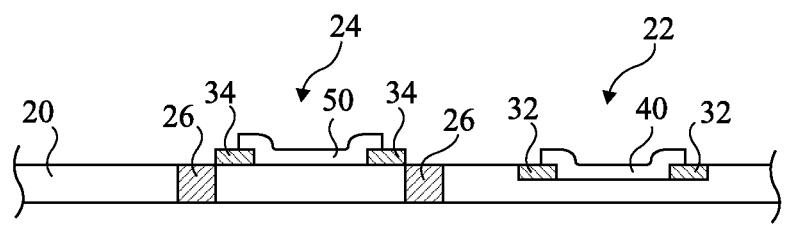

At the step illustrated in FIG. 8A, a portion 50 of PTC resistive paste has been deposited between pads 34 in the region 24 protected by peripheral wall 26. A deposit having a 10-μm thickness may be formed. The lateral dimensions of portion 50 are for example at least 100 μm by 200 μm. The PTC paste is for example based on carbon black in a thermoplastic polymer matrix. This step is followed by an anneal at 130° C. for from 15 to 30 min.

Figure 8B:
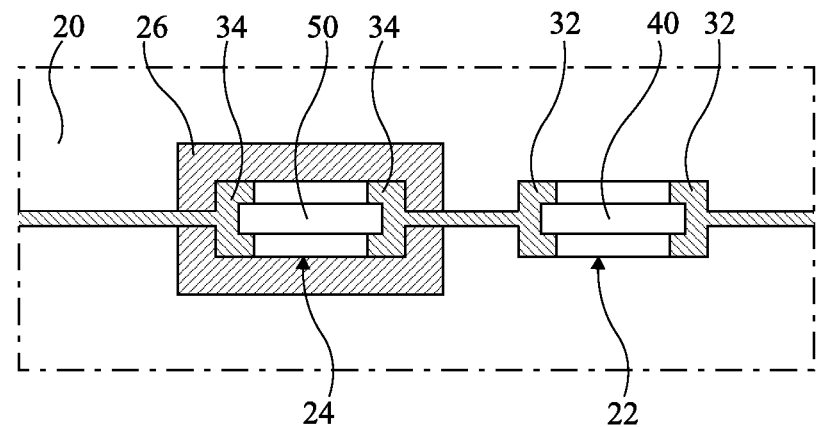

FIG. 8B is a top view of the obtained structure where the same references as in the previous drawings are used to designate the same elements.

Preferably, after deposition and treatment of resistive paste portions 40, 50, a hydrophobic passivation based on a fluorinated polymer of low dielectric constant (in the range from 2 to 3) is deposited. This deposition is carried out by silk-screening or by sputtering or even by inkjet and is followed by an anneal at 100° C. for from 20 to 30 minutes.

Figure 9:
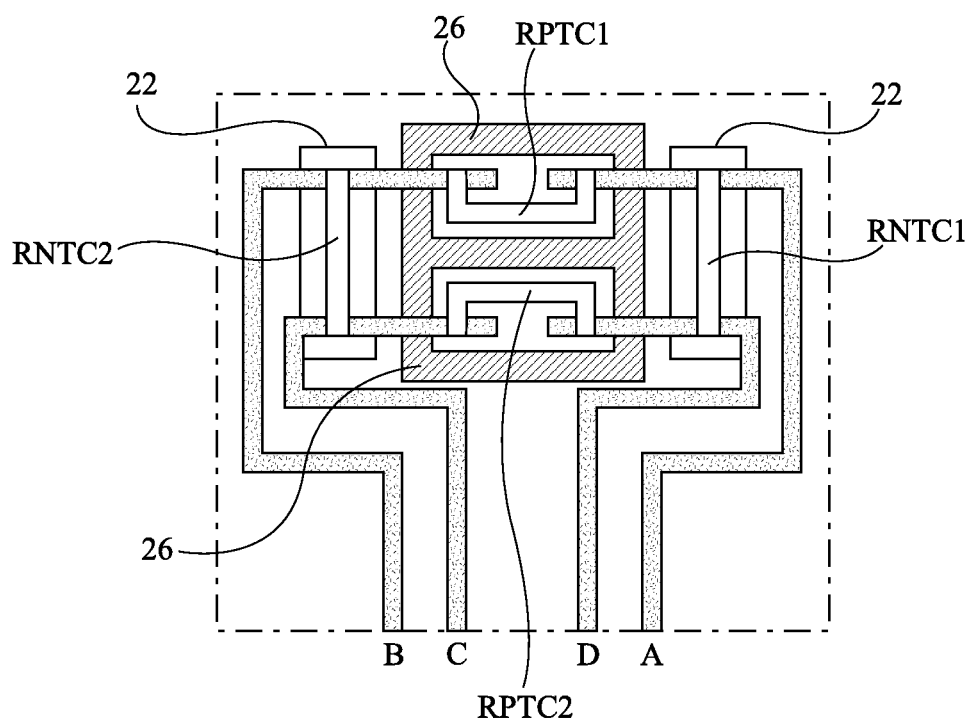
FIG. 9 is a top view showing a practical embodiment of a Wheatstone bridge assembly.

FIG. 9 illustrates the forming of a Wheatstone bridge assembly comprising the same elements as those illustrated in the circuit of FIG. 1 and designated with the same references.

Terminals A, B, C, and D are connected to the various resistors by metal conductors shown by densely stippled regions. Resistors RPTC1 and RPTC2 are surrounded with walls such as described in relation with FIG. 5A, and similarly collectively designated with reference numeral 26. Further, resistors RNTC1 and RNTC2 are each formed in a cavity 22 such as described in relation with FIG. 4A.

In a practical embodiment, each of the regions surrounded with an insulating wall has a surface area in the order of 2×4 mm$^2$, each of the NTC resistors has a length in the order of 4.5 mm and a 500-μm width, and the device has a general surface area in the order of 40 mm$^2$. This device has enabled to obtain sensitivities in the range from 0.07 to 0.09 volt/° C. with a 5-volt D.C. power supply.

Of course, the present invention is likely to have various alterations and modifications which will occur to those skilled in the art regarding the shapes of the regions surrounded with the resistive wall. Although this wall has always been shown herein as being rectangular, it may have any other shape.

It should further be noted that the embodiments of the various steps of the embodiment have been given as an example only and that many variations may be adapted by those skilled in the art.

Although the creation of thermally-insulated regions between the PTC and NTC resistors for a temperature has essentially been described herein, these resistors may be used to form other types of components. Indeed, NTC resistors, particularly based on ATO, are also pressure-sensitive and may be used to form a pressure sensor.

Although the creation of thermally-insulated regions has essentially been described for the thermal insulation between PTC and NTC resistors, it should be noted by those skilled in the art that these regions may be used to insulate any component capable of heating neighboring components.

It should also be noted that the examples given herein of specific resistive pastes enable to perform temperature measurements between 10 and 120° C., but that other resistive pastes may be used.

The invention claimed is:

1. A flexible film of a material in a crystalline or semicrystalline form, said film comprising first and second opposite faces and comprising, between the first and second faces, a first region of said material in the crystalline or semicrystalline form surrounded with a first wall of said material in an amorphized form.

2. The flexible film of claim 1, wherein the first amorphized crosses the entire film from the first face to the second face.

3. The flexible film of claim 1, wherein the material is polyethylene naphthalate or polyethylene terephthalate.

4. A sensor comprising:
the flexible film of claim 1; and
at least one first electric component formed on the first region and resting on the first face.

5. The sensor of claim 4, wherein the first electric component is a first heat-sensitive resistor.

6. The sensor of claim 5, wherein the first heat-sensitive resistor is made of a resistive paste.

7. The sensor of claim 5, wherein the flexible film comprises a first cavity different from the first region surrounded with the first wall, the sensor further comprising a second heat-sensitive resistor formed in the first cavity.

8. The sensor of claim 7, comprising third and fourth heat-sensitive resistors assembled as a Wheatstone bridge with the first and second heat-sensitive resistors.

9. The sensor of claim 8, wherein the flexible film comprises a second region surrounded with a second amorphized wall, the third heat-sensitive resistor being formed on the second region.

10. The sensor of claim 9, wherein the flexible film, comprises a second cavity different from the first region surrounded with the first wall and from the second region surrounded with the second wall, the fourth heat-sensitive resistor being formed in the second cavity.

* * * * *